Nov. 21, 1950 L. C. DANIELS 2,531,111
FRICTION DRIVE RUBBER TRACK
Filed April 22, 1946
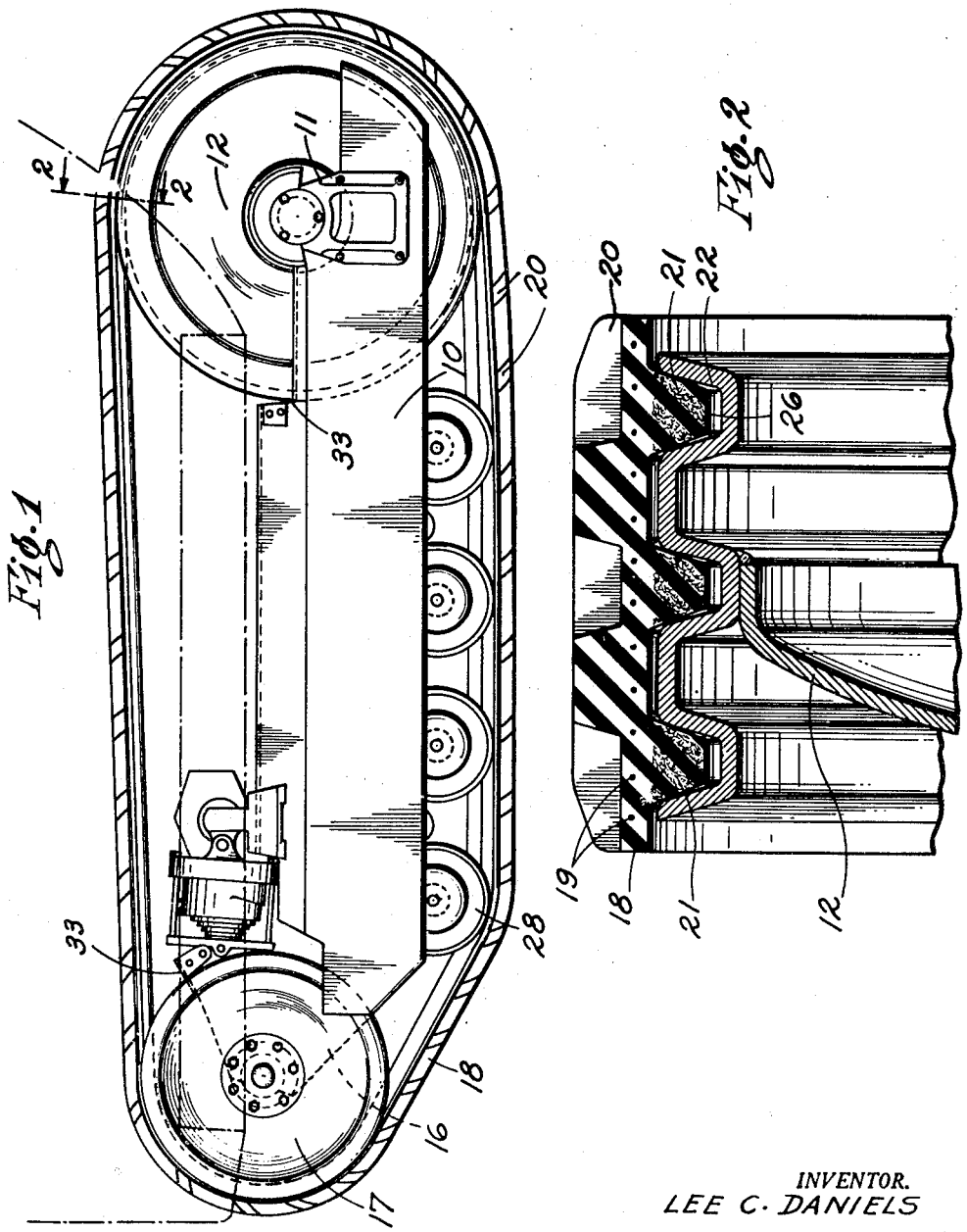
INVENTOR.
LEE C. DANIELS
BY Richey & Watts,
ATTORNEYS Patented Nov. 21, 1950

2,531,111

UNITED STATES PATENT OFFICE 2,531,111

FRICTION DRIVE RUBBER TRACK

Lee C. Daniels, Cleveland, Ohio, assignor to The Oliver Corporation, Chicago, Ill., a corporation of Delaware Application April 22, 1946, Serial No. 663,875

3 Claims. (Cl. 305—10)

This invention relates to wheel substitutes for land vehicles, and has found specific application in a flexible track for a crawler-type tractor.

An object of the invention is to provide a track having a high coefficient of friction with respect to polished metal surfaces, and which will maintain a high coefficient of friction when the surfaces are wet.

A further object is to provide a belt for a crawler tractor having strength and resistance to abrasion which will have a high coefficient of adhesion to a driving wheel despite the presence of water, mud, or ice.

A further object of the invention is to provide a belt for power transmission, or more specifically a track for a crawler tractor, which will have good adhesion to driving wheels of such materials as rolled or pressed steel which assume a glaze in service.

A still further object of the invention is to provide a track of the character described which may be readily and cheaply made from commercially available materials.

Other objects and advantages more or less ancillary to the foregoing and the manner in which all the various objects are realized will appear in the following description, which considered in connection with the accompanying drawings, sets forth the preferred embodiment of the invention.

Referring to the drawings wherein the preferred embodiment of the invention is illustrated:

Fig. 1 is a side elevation of a track structure of a crawler tractor; and

Fig. 2 is a section taken on the plane indicated by the numerals 2—2 of Fig. 1, through the novel track and the rim of the driving wheel.

Fig. 1 shows a track structure for a crawler tractor of the type disclosed in my copending application, Serial No. 550,744, filed August 23, 1944, now Patent 2,456,615, for "Track and Supporting Mechanism for Crawler Type Tractors". Since it is described in detail in the said copending application, the track structure will only be explained briefly herein.

The tractor frame assembly comprises side plates 10 of a form generally employed in track laying vehicles, journal bearings 11 mounted thereon for the support of a drive sheave 12 and pivotally supported arms 16 having idler pulleys 17 mounted on the end therefor for the tensive support of the track belt 18. The supporting structure for the idler pulley is of the general form customarily employed in crawler type tractors. Bogie wheels 28 support the weight of the tractor in the usual manner, permitting the track to conform to inequalities of the ground on which it is laid.

The track 18 as seen in Fig. 2, comprises a continuous belt formed of rubber or a similar flexible material reinforced with nonextensible metal cables 19 embedded in the body thereof and preferably disposed in a common plane in spaced relation with each other. The track is moulded or otherwise formed with rubber lugs or tread cleats 20 of rubber or a similar flexible material formed on the outer face thereof while the inner face of the track is formed with a plurality of parallel longitudinal ribs 21 having inclined side walls of the general configuration of a V-belt.

The drive sheave 12 is formed with grooves 22 in the face thereof, disposed in spaced relation for the reception of the ribs 21. The side walls of the grooves are formed with interfering angles relative to the inclined side walls of the ribs, i. e., the grooves converge inwardly, the included angle thereof being more acute than the included angle of the ribs 21 in the track so that the ribs may be wedged therein for driving engagement during rotation of the sheave. In order to provide an effective drive, the belt and the ribs are formed with as many ribs and grooves of uniform cross section as may be divided equally into the face of the sheave. The walls defining the grooves in the sheave wheels terminate adjacent the crests of the ribs 21 in the track. The portions of the sheave intermediate the grooves 22 are formed for clearance over the inner face 26 of the track so that frictional side wall engagement may be maintained during driving deformation of the track ribs, and the life of the belt prolonged as wear occurs.

The idler pulley 17 (Fig. 1) and the bogie wheels 28 are formed with grooves therein which are of complemental configuration to the ribs 21 of the track or belt 18, and described in my abovementioned copending application.

Scraper blades 33, mounted in any suitable manner, and formed in configuration with the wheels, may be provided to scrape foreign matter from the drive and idler wheels.

The structure so far described, employing a track made of conventional materials, and cast wheels, is disclosed and claimed in my abovementioned copending application. The track in the commercial embodiment of the previous invention was made of homogeneous rubber, and the contacting surfaces of the track and drive sheave were therefore rubber and metal, respectively, the metal in the earlier models of the device being malleable iron or cast steel. A very high degree of adhesion was obtained between the drive sheave and the track.

The invention was so successful that mass production was undertaken. To facilitate mass production it was found necessary or desirable to produce the wheels from pressed steel. As a result of actual operation with pressed steel wheels it was found that when running a tractor through water, adhesion between the drive sheave and the track was reduced to an undesirable extent, the water acting as a lubricant between the rubber and metal.

Upon research into the cause of this difficulty it was found that the pressed steel wheels assumed a very high polish or glaze in service, whereas the cast steel and malleable iron wheels previously used, due to their more crystalline or porous structure always retained a certain "tooth" or roughness. Since it was impractical to return to the use of malleable iron or cast steel for the drive sheave some other solution of the difficulty was needed.

The belt according to the present invention has been modified by the incorporation in the ribs 21 (Fig. 2), which engage the driving sheave of a material dispersed therethrough and forming part of the surface which engages the drive sheave, which will overcome the slipperiness of the belt when wet. One method of carrying out this invention which has been found highly satisfactory is to mold the ribs from a product which is prepared as follows: Old pneumatic tire casings which, of course, incorporate fabric in the form of cords for reinforcing purposes, are chopped up into small pieces perhaps 1/8 to 1/4 inch in size. These small chunks are thoroughly mixed with an appropriate quantity of new rubber which forms a binder, the resulting heterogeneous mass being vulcanized. The short sections of fabric will, of course, be disposed in a random matter within the ribs and a great many fiber ends will reach the surface of the rib where it engages the drive sheave.

The track according to the invention may be produced in other ways, however. The ribs may be molded of rubber in which sawdust, cork or fibers of cotton or other textile material have been mixed.

In any case the ribs 21 have disposed through them in a random manner material which, unlike rubber, has a high coefficient of friction against wet polished metal surfaces.

While the new track finds its most important application in connection with a drive sheave which has an inherent tendency to glaze, such as one of pressed steel, its use is highly desirable in connection with sheaves of a more crystalline metal since it will intend to increase the adhesion under unfavorable conditions when used with such drive sheaves.

While the invention has been developed for use as a track member for crawler tractors, it is clear that the principle of the invention is applicable to belts used for any power transmission purpose, since the primary object of the invention is to increase the factor of adhesion between the driving wheel and the belt. The invention is capable of improving the performance of belts in applications where water or other substances which act as lubricants between metal wheels and rubber belts are present.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A track for a crawler type vehicle having longitudinal ribs for engagement with a driving wheel and composed of a soft flexible material, the part of said track adjacent the surface of said ribs having incorporated therein a randomly disposed flocculent material.

2. A belt for power transmission having longitudinal ribs for engagement with a driving wheel and composed of a soft flexible material, the part of said belt adjacent the surface of said ribs having incorporated therein a randomly disposed flocculent material.

3. A belt for power transmission composed of a soft flexible material, at least part of said material having incorporated therein a randomly disposed flocculent material.

LEE C. DANIELS.

REFERENCES CITED

The following references are of record in the file of this patent:

UNITED STATES PATENTS

| Number | Name | Date |
|---|---|---|
| 1,400,100 | Reddaway | Dec. 13, 1921 |
| 1,611,829 | Freedlander | Dec. 21, 1926 |
| 2,412,122 | Campbell | Dec. 3, 1946 |